United States Patent [19]
Epstein et al.
[11] 3,903,210
[45] Sept. 2, 1975

[54] PRODUCTION OF TOXIC ORGANO PHOSPHORUS COMPOUNDS

[75] Inventors: Joseph Epstein, Baltimore, Md.; Kenneth E. Levy, Los Angeles, Calif.; Harry O. Michel, Towson, Md.

[73] Assignee: The United States of America as represented by the Secretary of the Army, Washington, D.C.

[22] Filed: Apr. 22, 1958

[21] Appl. No.: 730,758

[52] U.S. Cl. .............. 260/978; 260/239 C; 260/979; 260/999; 424/211
[51] Int. Cl.$^2$ .......................................... C07F 9/165
[58] Field of Search ............ 260/461.309, 461.310, 260/461.312, 567.6, 461.113, 461.112, 260/461.110, 978, 979; 424/211

[56] References Cited

UNITED STATES PATENTS

| | | | |
|---|---|---|---|
| 2,736,726 | 2/1956 | Gaetzi et al. | 260/979 X |
| 2,767,194 | 10/1956 | Francher | 424/200 X |

FOREIGN PATENTS OR APPLICATIONS

| | | |
|---|---|---|
| 783,281 | 9/1957 | United Kingdom |

*Primary Examiner*—Leland A. Sebastian
*Attorney, Agent, or Firm*—Nathan Edelberg; Robert P. Gibson; Kenneth P. Van Wyck

EXEMPLARY CLAIM

1. A method of producing a compound of the formula

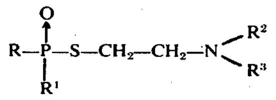

which comprises cyclizing in an alkaline aqueous solution a beta-chloroethylamine of the formula

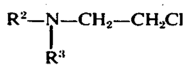

to thereby form a solution containing the ethyleneimmonium ion

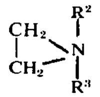

and reacting said ionized solution with an alkali metal salt of the formula

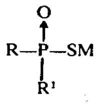

R and $R^1$ in the above formulas being selected from the class consisting of alkyl and alkoxy groups, $R^2$ and $R^3$ being alkyl groups containing more than one carbon atom, and M being selected from the class consisting of sodium and potassium.

11 Claims, No Drawings

PRODUCTION OF TOXIC ORGANO PHOSPHORUS COMPOUNDS

This invention described herein may be manufactured and used by or for Government of the United States of America for governmental purposes without the payment to us of any royalty thereon.

This invention relates to the production of toxic organic compounds of the formula

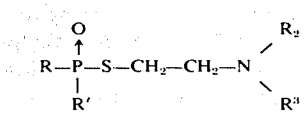

wherein R and R′ are alkyl or alkoxy groups, preferably methyl, methoxy, ethyl, ethoxy, isopropyl, or isopropoxy, and $R^2$ and $R^3$ are alkyl groups containing more than one carbon atom, preferably ethyl or isopropyl. (If $R_2$ and/or $R_3$ are methyl the process is unsuccessful).

The method comprises cyclizing a betachloroethyl dialkyl amine in a strongly basic aqueous solution, thereby giving a dialkylethyleneimmonium ion, and reacting the ionized solution with the sodium or potassium salt of the proper phosphorus-containing acid.

These compounds are useful as chemical warfare toxic agents. They have low volatilities and are usable in weapons such as bombs, shells, aerosol generators, etc., which are adapted to disseminate relatively nonvolatile agents.

The process may also be used to prepare toxic compounds in situ in bodies of water, such as ponds, lakes, streams, etc. The reaction will take place in extremely dilute solutions, although the rate of reaction is relatively slow under those conditions. The bimolecular reaction rate constant for the reaction between the ethylene immonium ion and the phosphorothiolate ion has been found to be about 2.5 liters per mole per hour, and that between the ethyleneimmonium ion and the phosphonothiolate ion about 4 liters per mole per hour. Thus the cyclized amine solution and the phosphoro, phosphono, or phosphinothiolate solutions, which are non-toxic, may be added to a body of water and there allowed to react to produce the toxic compound.

Alternatively, the reactants may be mixed in a container shortly before use and allowed to react. The reaction mixture may then be added to the body of water.

This procedure may be used for pesticidal purposes.

One embodiement of the method comprises the following steps:

a. Adding an aqueous solution of the hydrochloride of a beta-chloroethyl dialkyl amine,

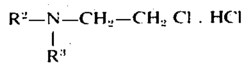

to an aqueous solution of an alkali metal dialkyl phosphorothiolate

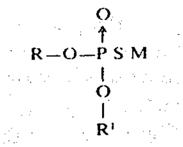

an alkali metal alkyl alkylphosphonothiolate

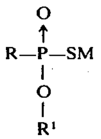

or an alkali metal phosphinothiolate

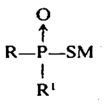

wherein M is sodium or potassium and R, $R^1$, $R^2$ and $R^3$ are alkyl groups, under strongly alkaline conditions.

b. allowing the mixture to stand until the reaction represented by the equation

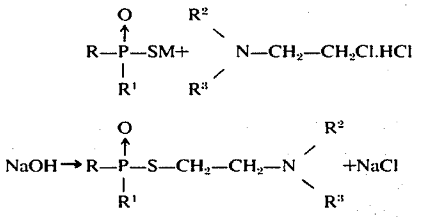

has taken place, and c. extracting the organic product from the aqueous alkali metal chloride solution with a water immiscible organic solvent.

The solvent may be evaporated from the product, or, alternatively, the solution of the product in the solvent may be utilized as such. Moreover, in some cases step (c) may be omitted and the aqueous solution used as the toxic agent, for example by addition to bodies of water, as discussed above.

While the equation given above represents the overall reaction, the actual mechanism appears to involve the cyclization, in the strongly basic solution, of the betachloroethyl dialkyl amine to give the dialkyl ethyleneimmonium ion

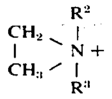

and the chloride ion. Through the measurement of chloride ion production, it has been established that a complete ionization of the amine molecule takes place in less than 10 minutes at pH 10.

The immonium ion then apparently adds directly to the phosphorothiolate, phosphonothiolate, or phosphinothiolate ion to give the final product.

Several other variations of the general method set out above are given in the discussion which follows.

The following Examples illustrate our process.

EXAMPLE 1

O,O-Diethyl S-Diethylaminoethyl Phosphorothiolate

To 100 ml. of water containing 6.2 g of the potassium salt of diethylphosphorothiolate (0.03 moles), adjusted to pH 10 by addition of concentrated sodium hydroxide, was added with stirring 25 ml. of an aqueous solution of beta-chlorethyl diethylamine hydrochloride containing [illegible] g (0.02 moles) of the hydrochloride. The solutions were mixed well until the solution showed a maximum and constant anticholinesterase activity (approximately 3 hours at room temperature). The pH was adjusted to 10.5 and the mixture extracted with five 50 ml. portions of distilled benzene (until the aqueous phase showed negligible anticholinesterase activity) and the extract was dried over anhydrous sodium sulfate. The benzene solution was placed in a shallow evaporating dish and the benzene allowed to evaporate to constant volume. The oil in the evaporating dish was washed into a distilling apparatus with a small quantity of dried ethyl ether. The ether solution was subjected to fractional distillation at reduced pressure. The compound boiled at 96°–98°/ca 0.5 mm Hg. It had an anticholinesterase activity of 93 percent of the most potent sample of O,O-Diethyl S-Diethylaminoethyl Phosphorothiolate yet tested. Based on comparison of the anticholinesterase activity of the aqueous solution with that of the pure compound, the yield in solution was about 58 percent. The isolated product was obtained in a yield of about 40 percent, based on the amine salt.

Another experiment carried out in the same manner, but using a molar ratio of potassium salt to amine salt of 4.1 gave a yield (in solution) of 87 percent.

We have found that side reactions can be minimized by beginning the reaction at a higher pH, then, after the initial cyclization period, adding acid to lower the pH. Example 2 illustrates this practice and also shows the production of the phosphonothiolate type compounds.

EXAMPLE 2

O-Ethyl S-Diethylaminoethyl Ethylphosphonothiolate

To 50 ml. of a 0.4 M NaOH solution (0.02 moles) was added 100 ml. of an aqueous solution containing 9.17 g of potassium ethylphosphonothiolate of 84 percent purity (0.04 moles). Then 200 ml. of an aqueous solution containing 3.44 g (0.02 moles) of beta-chloroethyl diethylamine hydrochloride was added. The solutions were mixed and allowed to stand for 5 minutes. The pH of the solution was between 10.0 and 10.5. After 5 minutes, 50 ml. of 0.04 M acetic acid was added. The pH dropped to 5.15. The solutions were mixed well and at various time intervals aliquots were extracted and tested for anticholinesterase activity until the activity was constant. The pH had increased to approximately 8.8 at the time of constant activity.

The solution was then brought to pH 10.5 and extracted with diethyl ether until the aqueous phase had negligible anticholinesterase activity. The ether extract was dried over anhydrous sodium sulfate and distilled. The overall yield after distillation was 70 percent. The yield in solution was 75 percent based on anticholinesterase activity.

The recovered sample was compared with a highly purified sample of O-ethyl S-diethylaminoethyl ethylphosphonothiolate prepared by a different method. The sample produced in this Example had 92 percent of the anticholinesterase activity of the purified sample.

Still another variation that has yielded excellent results involves adding the amine hydrochloride to sodium hydroxide, allowing cyclization to take place, adding an acid to lower the pH, and thereafter adding the phosphorothiolate salt.

Example 3 illustrates this variation.

EXAMPLE 3

O,O-Diethyl S-Diethylaminoethyl Phosphorothiolate

A 0.048 molar aqueous solution of betachloroethyl diethylamine hydrochloride was made alkaline by addition of two equivalents of NaOH. After 5 minutes an exesss of acetic acid was added, lowering the pH to 4.6 A 0.106 molar solution of potassium diethylphosphorothiolate was then added. A yield, in solution, of virtually 100 percent was obtained. About 45 hours was required for the reaction to go to completion.

EXAMPLE 4

O-Ethyl S-Diethylaminoethyl Methylphosphonothiolate

Potassium ethyl methylphosphonothiolate is added to an aqueous solution of sodium hydroxide and the solution adjusted to pH 10. An aqueous solution of beta-chloroethyldiethylamine hydrochloride at pH 10 is then added and the reaction mixture treated in the same manner as in Example 2.

EXAMPLE 5

O,O-Diisopropyl S-Diethylaminoethyl Phosphorothiolate

The potassium salt of diisopropyl phosphorothiolate is added to an aqueous solution of sodium hydroxide and the pH adjusted to 10. An aqueous solution of beta-chloroethyldiethylamine hydrochloride at pH 10 is added and the mixture treated in the same manner as in Example 2.

EXAMPLE 6

O-Isopropyl-S-Diethylaminoethyl Isopropylphosphonothiolate

Sodium isopropyl isopropylphosphonate is dissolved in water and the pH adjusted to 10 by addition of concentrated sodium hydroxide. An aqueous solution of beta-chloroethyldiethylamine hydrochloride at pH 10 is added and the mixture is then treated in the same manner as in Example 2.

EXAMPLE 7

S-Diethylaminoethyl Ethylethylphosphinothiolate

Potassium ethylethylphosphinothiolate is dissolved in water and the pH adjusted to 10 by addition of concentrated sodium hydroxide. An aqueous solution of beta-chloroethyldiethylamine at pH 10 is then added and the mixture treated in the same manner as in Example 2.

EXAMPLE 8

O-Isopropyl-S- Diisopropylaminoethyl Methylphosphonothiolate

Potassium isopropyl methylphosphonothiolate is dissolved in water and the pH of the solution is ajusted to 10 by addition of concentrated sodium hydroxide. An aqueous solution of beta-chloroethyl diisopropylamine at pH 10 is added. The mixture is then treated in the same manner as Example 2.

EXAMPLE 9

Preparation of a Toxic Compound in Situ

Fifteen pounds of betachloroethyl diethylamine hydrochloride is dissolved in 100 gallons of water and the solution is brought to pH10 by addition of sodium hydroxide. After standing for at least 10 minutes, it is added to a pond containing 100,000 gallons of water. Fifteen pounds of sodium ethyl methylphosphonothiolate is then added in aqueous solution. In 25 hours the pond contains 0.2 parts per million of O-ethyl S-diethylaminoethyl methylphosphonothiolate, which concentration is extremely toxic to small fish species and to small mammals, such as rats. The concentration continues to increase with time. When the desired kill has been accomplished, the pond is decontaminated by chlorination.

The method of this invention is particularly advantageous in the following respects:

a. The salts used are soluble in the solvent (water) so that the reaction takes place in a homogenous phase.

b. The reaction proceeds at room temperature without need for either heating or cooling.

c. The by-product, sodium chloride, is soluble in the solvent. The main product is likewise partially water soluble but is readily removed by extraction with water-immisicible solvents. It is therefore unnecessary to employ filtration, which is particularly undesirable in handling these highly toxic materials. Extraction and distillation can be carried out continuously in completely enclosed system.

d. A product of high purity is obtained with a minimum amount of purification.

e. It is suitable for the preparation of toxic compounds in situ in aqueous solution.

We claim:

1. A method of producing a compound of the formula

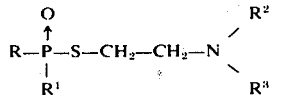

which comprises cyclizing in an alkaline aqueous solution a beta-chloroethylamine of the formula

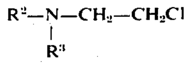

to thereby form a solution containing the ethyleneimmonium ion

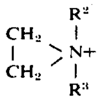

and reacting said ionized solution with an alkali metal salt of the formula

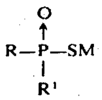

R and $R^1$ in the above formulas being selected from the class consisting of alkyl and alkoxy groups, $R^2$ and $R^3$ being alkyl groups containing more than one carbon atom, and M being selected from the class consisting of sodium and potassium.

2. A method as defined in claim 1 comprising dissolving the said salt and the hydrochloride of said amine in a strongly alkaline aqueous solution, allowing said solution to stand until the cyclization has taken place, then acidifying said solution and allowing it to stand until it attains a substantially maximum and constant anticholinesterase activity.

3. A method as defined in claim 1 comprising adding sufficient alkaline hydroxide to an aqueous solution of the hydrochloride of said amine to give a pH of about 10, allowing said solution to stand until cyclization has taken place, acidifying said solution, adding said salt to said solution and allowing it to stand until it attains a substantially maximum and constant anticholinesterase activity.

4. A method as defined in claim 1 comprising adding an aqueous solution of the hydrochloride of said amine to a strongly alkaline aqueous solution of said salt and allowing said mixture to stand until it attains a substantially maximum and constant anticholinesterase activity.

5. A method of producing a compound of the formula

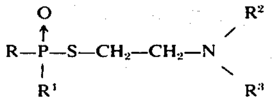

which comprises adding a beta-chloroethyl dialkylamine hydrochloride of the formula

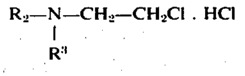

to a strongly alkaline aqueous solution of a compound of the formula

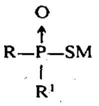

and allowing the mixture to stand until reaction has taken place, R and $R^1$ in above formulas being selected from the class consisting of alkyl and alkoxy groups, $R^2$ and $R^3$ being alkyl groups containing more than one carbon atom, and M being selected from the class consisting of sodium and potassium.

6. A method of making an O,O-dialkyl S-dialkylaminoethyl phosphorothiolate of the formula

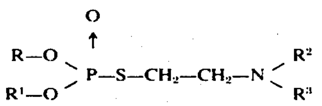

which comprises adding an aqueous solution of a beta-chloroethyldialkylamine hydrochloride of the formula

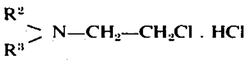

to a strongly alkaline solution of a compound of the formula

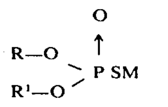

R and $R^1$ in the above formulas being alkyl groups $R^2$ and $R^3$ being alkyl groups containing more than one carbon atom and M being selected from the class consisting of sodium and potassium, and allowing the mixture to stand until reaction has taken place.

7. A method of producing O,O-diethyl S-diethylaminoethyl phosphorothiolate which comprises adding an aqueous solution of beta chloroethyl diethylamine hydrochloride to a strongly alkaline aqueous solution of sodium O,O-diethyl phosphorothiolate and allowing the mixture to stand until reaction has taken place.

8. A method of producing an O-alkyl S-dialkylaminoethyl alkylphosphonothiolate which comprises adding a beta chloroethyl dialkylamine hydrochloride to a strongly alkaline solution of a compound of the formula

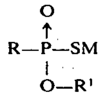

wherein R and $R^1$ are alkyl groups and M is selected from the class consisting of sodium and potassium, and allowing the mixture to stand until reaction has taken place.

9. A method of producing O-ethyl S-diethylaminoethyl ethylphosphonothiolate which comprises adding beta chloroethyl diethylamine hydrochloride to a strongly alkaline aqueous solution of sodium O-ethylphosphonothiolate and allowing the mixture to stand until reaction has taken place.

10. A method of preparing a toxic compound in situ in a body of water comprising cyclizing in a strongly basic aqueous solution a beta-chloroethyl dialkyl amine of the formula

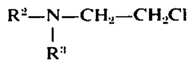

to thereby form a solution containing the ethylene immonium ion

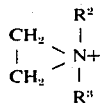

adding said ionized solution to said body of water, and adding to said body of water an alkali metal salt of the formula

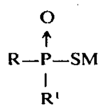

R and $R^1$ in the above formulas being selected from the class consisting of alkyl and alkoxy groups, $R^2$ and $R^3$ being alkyl groups containing more than one carbon atom, and M being selected from the class consisting of sodium and potassium.

11. A method of producing a compound of the formula

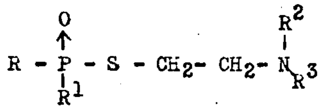

which comprises cyclizing in a strongly alkaline aqueous solution a beta-chloroethylene of the formula

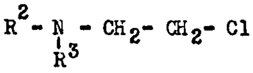

to thereby form a solution containing the ethylene immonium ion

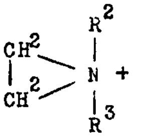

and reacting said ionized solution with an alkali metal salt of the formula

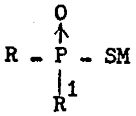

R and $R^1$ in the above formulas being selected from the group consisting of methyl, methoxy, ethyl, ethoxy, isopropyl, and isopropoxy and $R^2$ and $R^3$ are selected from the group consisting of ethyl and isopropyl and M being selected from the group consisting of sodium and potassium.

* * * * *